Sept. 6, 1949.   B. M. JOHNSON   2,481,223
HOIST AND TOW MECHANISM
Filed June 14, 1946                      2 Sheets-Sheet 1

Witness
Edward P. Seeley

Inventor
Bennett M. Johnson
By Harry L. Yunger
Attorney

Sept. 6, 1949.　　　　　　　B. M. JOHNSON　　　　　　　2,481,223
HOIST AND TOW MECHANISM
Filed June 14, 1946　　　　　　　　　　　　　　　2 Sheets-Sheet 2
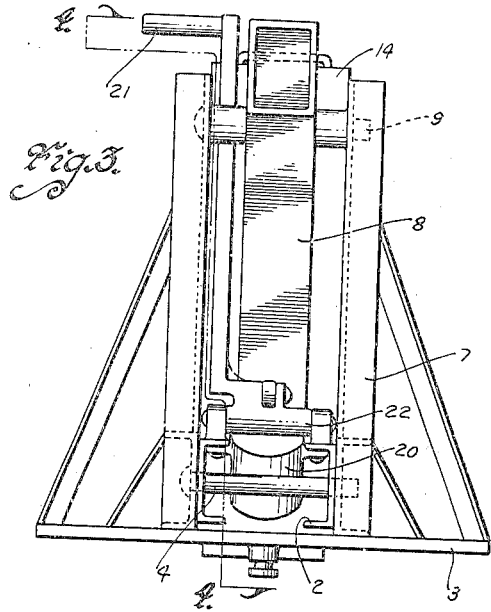
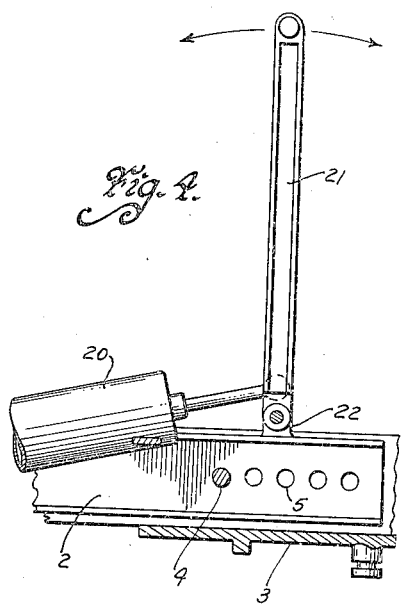
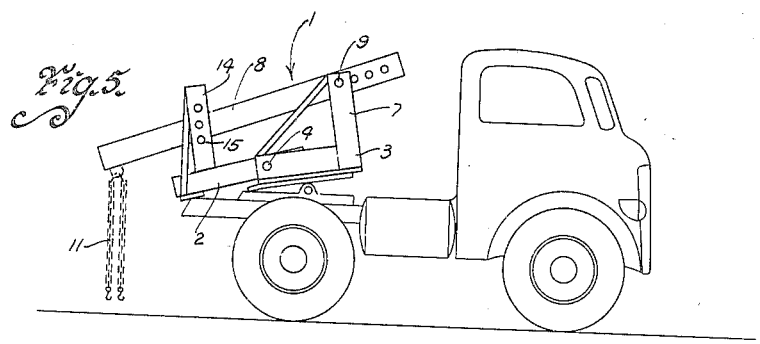
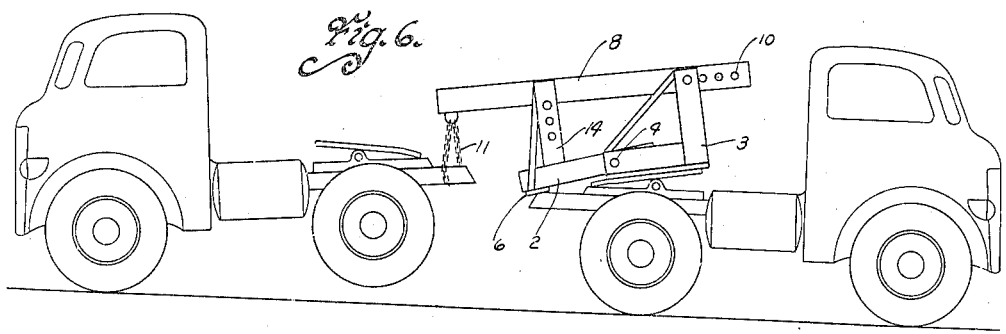
Inventor
Bennett M. Johnson
By Harry L. Yenger
Attorney
Witness
Edward P. Seeley Patented Sept. 6, 1949

2,481,223

UNITED STATES PATENT OFFICE 2,481,223

HOIST AND TOW MECHANISM

Bennett M. Johnson, Des Moines, Iowa

Application June 14, 1946, Serial No. 676,782

14 Claims. (Cl. 214—86)

This invention relates to a hoist mechanism for lifting an article and more particularly to a hoist mechanism in combination with a live tractor to hoist and tow a stalled tractor.

In the use of tractors and trailers in the transportation business, it often occurs that on the highway the tractor becomes inoperable and it is necessary to have the tractor repaired before a pay load can proceed. When a breakdown of a tractor and trailer occurs on the road, the present practice is to send out a tow mechanism to remove the stalled tractor and trailer from the highway or get it into running order so it can proceed to its destination. If it is necessary to remove the tractor and trailer by towing, it is generally the case that the towing mechanism plus the stalled tractor and trailer exceed the maximum length of vehicles allowed on the highways by State laws. Special permission to move the stalled tractor and trailer over the highways must be gained and the authorities generally grant that privilege to the nearest place where the stalled tractor can be repaired. All trucking concerns operate their own garages and like to do any repair work in their own garages because many economies can be practiced and the work done cheaper. When a breakdown occurs on the highway and the work is done at an independent repair station, labor and cost of repair is not only higher but a delay factor occurs, in that the independent concern is not always able to start work immediately on the stalled tractor. Then too, the driver or drivers are delayed on the highway until a tow means arrives with their wages going on all the time. The drivers stay with the tractor and trailer while being towed and generally wait at the place of repair until the tractor and trailer are repaired with their wages and expenses mounting up each passing hour.

It is an object of the invention, among others to provide a hoist mechanism that is simple and economical in construction; durable and long lasting in operation; a hoist mechanism easy to operate and operable by one man; and a hoist mechanism requiring no special skill on the part of an installator to assemble and install.

It is a further object of the invention among others to provide a hoist mechanism in combination with a fifth wheel of a tractor that will fit the fifth wheel of any road tractor and any regular road tractor may be converted to a tow means without any great effort; a towing means that can pull any stalled tractor or trailer and remain within the legal length of vehicle allowed on the highways; a towing means wherein a live tractor may be taken out to a breakdown by one man; the stalled tractor removed from a trailer and the live tractor coupled to the trailer and the driver and load proceed to their destination without any more worry regarding the stalled tractor; the stalled tractor coupled to the tow means and returned to the company garage for repair; a tow means and operation that conserves time of tractor, trailer units and drivers and allows operation again after breakdown with a minimum loss of time; a tow means and operation that cuts down expense of getting to stalled tractors, getting them towed in for repair and the repairs are done at a minimum expense; a tow means and operation where only one man is required to deliver a live tractor to a breakdown and return a stalled tractor for repair; a tow means that has a maximum degree of safety on the road; and a tow means and operation that is simple in operation and reduces the cost of a breakdown to a minimum.

With the foregoing and other objects in view, the invention will be more fully described hereinafter and will be particularly pointed out in the claims appended hereto.

In the drawings, wherein like symbols refer to like or corresponding parts throughout the several views:

Figure 3 is an end elevational view of the hoist mechanism of the left side of Figure 1.

Figure 4 is a fragmentary elevational view of the hydraulic lift means.

Figure 5 is an elevational view of a live tractor with the towing hoist mechanism mounted thereon.

Figure 6 is an elevational view of a live tractor with a towing hoist mechanism mounted thereon and towing a stalled tractor.

Figure 1:
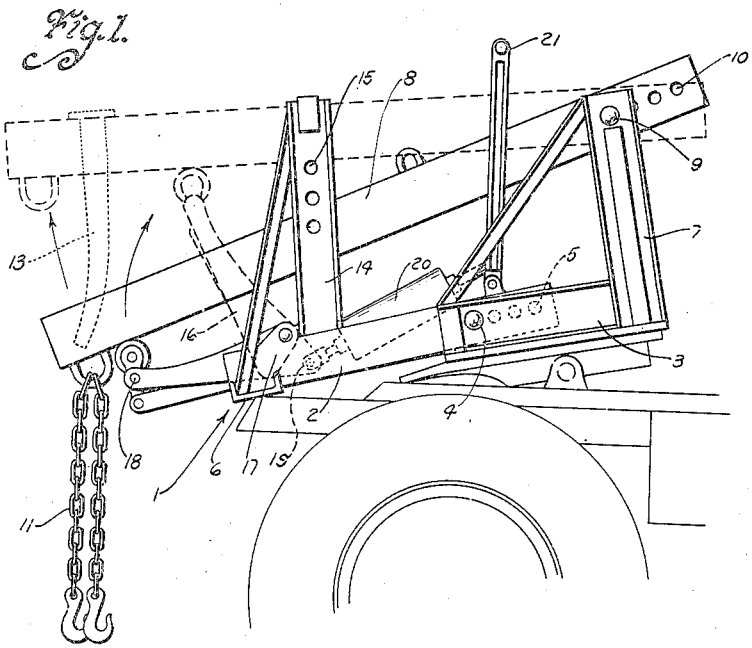
Figure 1 is a side elevational view of a hoist mechanism mounted on a tractor with the boom shown in raised position by dotted lines.
Figure 7:
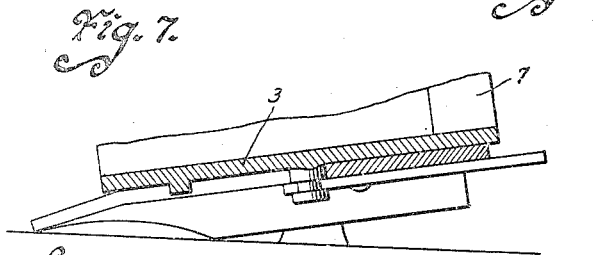
Figure 7 is an enlarged detail showing the connection between the fifth wheel of a tractor and the hoist mechanism.

In Figure 1 is shown a hoist mechanism with the base represented at 1 and made in two sections 2 and 3. The sections 2 and 3 are connected together movably by bolt 4 and the base section 2 has a series of openings 5 which allows the bolt 4 to be placed in any selected openings 4 and the opening (not drawn) in the section 3. The two sections 2 and 3 are then pivotally connected together about bolt 4 and by selection of which opening 5 bolt 4 is placed through; the length of base member 1 can be varied. The section 3 of the base has means, as shown in Figure 7, that fit into a groove in the fifth wheel of a tractor and the base section 3 is attached to the fifth wheel of a tractor in a manner identical with the method employed to couple a trailer to a tractor. The fifth wheel tractor coupling for a trailer is old and well known in the art and applicant lays no claim of novelty to this feature. The section 2 of the base 1 extends toward the rear of the tractor and has an abutment member 6 which rests on the back portion of the tractor frame. The abutment member 6 provides a reaction point between the tractor and any weight being raised by the hoist mechanism. The adjustment of the base sections 2 and 3 is provided for different length tractors so that abutment of 6 will always rest on the back frame of the tractor. The base may be constructed of channel irons of a sufficient size and strength to care for any load factor desired.

Attached to the base 1 and as shown in Figure 1 to the base section 3 is a member 7 made of channel irons and of sufficient strength for the load requirements desired. The member 7 may be attached to the base section 3 in any suitable manner, such as by rivets, bolts or welding, and as in the case of the present drawings the member is upright and perpendicular with regard to the base 1. The upright member 7 may be made of suitable angle or channel irons, the only requirement being that they be of sufficient size and strength to carry the load.

Figure 2:
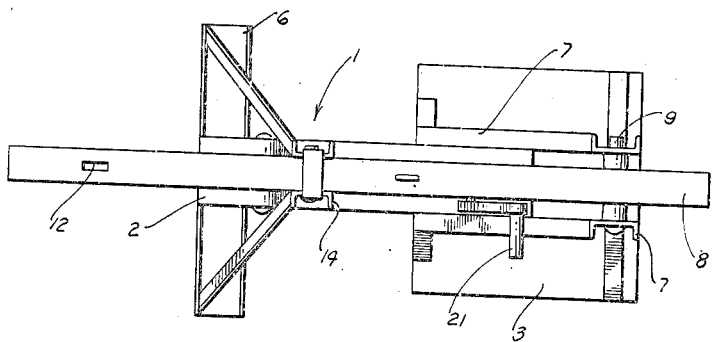
Figure 2 is a plan view of the hoist mechanism.

Connected to the upright member 7 is a boom member 8. The boom 8 is movably connected to the upright member 7 as by a bolt 9 passing through the upright member 7 and through one of a series of openings 10. The boom 8 is adjustable longitudinally or horizontally of the base 1 by a selection of openings 10 in the boom 8. The boom 8 has chains 11 on the other end thereof which attach to a member to be raised and also provide towing means if a member is to be towed. The boom 8 has an opening 12, best seen in Figure 2, which receives a spike-like bumper member 13 which serves as a stop means when a tractor is being towed and prevents damage to the front of a tractor, or the back of the tractor, as the case may be, from the swinging action of the towed vehicle.

A second upright member 14 is attached to the base 1 by being attached to the section 2 of the base as by welding, rivets or bolts and is also made of channels or angle irons as desired. The boom moves up and down within the upright member 14 and said upright member has a series of openings 15 through which a bolt may pass (not shown) to provide a support for the boom 8 when it is in raised position and lock the boom 8 in raised position.

An arm 16 is pivotally connected to a bracket 17 attached to the base section 2 and one end 18 contacts the boom 8 while the other end 19 is contacted by a hydraulic lift 20 which is operated by hand from handle 21. Handle 21 is pivotally connected to the base section 3 (as best shown in Figure 4) at 22.

Figure 5 shows diagrammatically a live tractor in a garage, that is, any tractor unit that is available in the garage that has a fifth wheel. The hoist mechanism is lifted by garage crane and mounted on the fifth wheel of the tractor unit and coupled to the tractor in the same manner employed to couple a trailer to the tractor. If a breakdown to a tractor has occurred on the highway, a new live tractor as shown in Figure 6 is connected to the tow tractor with the steering gear on the towed tractor locked. One man is then able to tow the live tractor to the scene of a breakdown. The trailer is raised and the stalled tractor is pulled out of the way after the live tractor coupled to the tow tractor has been uncoupled. The live tractor towed to the breakdown scene is then coupled to the trailer and the driver proceeds on his way with the pay load, leaving the stalled tractor to the driver of the tow tractor. The driver of the tow tractor then couples the stalled tractor to the tow tractor and returns to the company garage, where the necessary repairs may be made on the stalled tractor.

It can therefore be seen that a hoist mechanism is provided that is simple and economical in construction, in that it can be made from angle or channel irons, or pipe, if necessary, and of regular stock sizes; that no machining is necessary and hence expense of construction is held to a minimum. The hoist mechanism is made of strong materials to begin with and strong couplings and connections are used, hence is durable and long lasting in operation, only being subject to wear from the elements. From the explanation preceding it can be seen that the hoist mechanism is simple to operate and does not take a skilled mechanic to make it effective. While the hoist mechanism is large and weighty, it can be placed on and removed from the fifth wheel of a tractor by use of a garage crane, which can be easily handled by one man. Once coupled to the fifth wheel one man can easily operate the structure.

When the hoist mechanism is placed on the fifth wheel of a live tractor it can easily be seen that a combination results that is effective on any road tractor that possesses a fifth wheel. This results in the advantage that any tractor available at the time a breakdown occurs can be used as a tow means, hence no investment of capital is tied up in a special piece of equipment. When a breakdown occurs on a highway with a tractor-trailer unit, it is most generally a breakdown caused by some mechanical failure in the tractor. Very seldom is it necessary to tow a trailer in for repairs except in case of an accident on the highway. In the present combination, the stalled tractor is uncoupled from the trailer; a new tractor substituted and the stalled tractor hooked to the tow tractor. Hence there is never any need to tow the trailer. It is only when both the stalled tractor and trailer are towed that the length of vehicle exceeds the maximum length allowed. Further, in the present operation, the trailer carrying the pay load is away and gone with a new live tractor and worry from the trailer never enters the picture to cause trouble. It can be seen that the trailer or pay load is off and on the way to its destination with a minimum loss of time in transit and with a minimum loss of wages paid with no productive gain to a transportation company. The stalled tractor is towed back to the company garage for repair where parts are available, skilled mechanics on the particular stalled tractor available, tools and everything to effect repairs which will result in a minimum cost. One point that is particularly noteworthy is that only one man is required to tow a live tractor to a breakdown and return the stalled tractor for repair. Where a live or stalled tractor is the only mechanism ever towed there is no danger of the vehicle ever exceeding the maximum limit allowed on the highways.

While the invention has been described in connection with several specific embodiments, it is to be understood that the words which have been used are words of description rather than limitation, and that practice of the invention within the scope of the appended claims may be resorted to without departing from the true scope of the invention in all its aspects.

I claim:

1. A hoist mechanism comprising a base made in two sections pivotally secured together and adjustable horizontally to vary the length of the base, upright members attached to each section of the base, a boom pivotally connected to one of the upright members, means for raising and lowering the boom associated with the base sections and means associated with the second upright member to lock the boom in the desired upward position when raised.

2. A hoist mechanism comprising a base made in two sections pivotally secured together and adjustable horizontally to vary the length of the base, upright members attached to each end of the base sections, a boom pivotally and horizontally adjustably connected to one of the upright members, means for raising and lowering the boom associated with the base sections and means associated with the second upright member to lock the boom in the desired upward position when raised.

3. A hoist mechanism comprising a base made in two sections pivotally secured together and adjustable horizontally to vary the length of the base, upright members attached to each section of the base, a boom pivotally connected to one of the upright members, a hydraulic lift connected to one section of the base, an arm pivotally connected to the other section of the base having one end of the arm in contact with the hydraulic lift and the other end of the arm in contact with the boom and means associated with the second upright member to lock the boom in the desired upward position when raised.

4. A hoist mechanism comprising a base made in two sections pivotally secured together and adjustable horizontally to vary the length of the base, upright members attached to each section of the base, a boom pivotally and horizontally adjustably connected to one of the upright members, a hydraulic lift connected to one section of the base, an arm pivotally connected to the other section of the base having one end of the arm in contact with the hydraulic lift and the other end of the arm in contact with the boom and means associated with the second upright member to lock the boom in the desired upward position when raised.

5. In combination with a live tractor having a fifth wheel, a towing hoist mechanism for a stalled tractor comprising a base having means to attach the towing hoist to the fifth wheel of the live tractor, a member attached to the base, a boom movably connected to the member on the base with attaching means on the end of the boom to connect the live tractor to the stalled tractor and means for raising and lowering the boom.

6. In combination with a live tractor having a fifth wheel, a towing hoist mechanism for a stalled tractor comprising a base having means to attach the towing hoist to the fifth wheel of the live tractor, a member attached to one end of the base, a boom movably connected to the member on the base with attaching means on the end of the boom to connect the live tractor to the stalled tractor and means connected with the base and boom for raising and lowering the boom.

7. In combination with a live tractor having a fifth wheel, a towing hoist mechanism for a stalled tractor comprising a base having means to attach the towing hoist to the fifth wheel of the live tractor, an upright member attached to one end of the base, a boom pivotally connected to the upright member with attaching means on the end of the boom to connect the live tractor to the stalled tractor and means for raising and lowering the boom.

8. In combination with a live tractor having a fifth wheel, a towing hoist mechanism for a stalled tractor comprising a base having means to attach the towing hoist to the fifth wheel of the live tractor, an upright member attached to one end of the base, a boom pivotally and horizontally adjustably connected to the upright member with attaching means on the end of the boom to connect to the stalled tractor and means for raising and lowering the boom.

9. In combination with a live tractor having a fifth wheel, a towing hoist mechanism for a stalled tractor comprising a base having means to attach the towing hoist to the fifth wheel of the live tractor, upright members attached to each end of the base, a boom pivotally connected to one of the upright members with attaching means on the end of the boom to connect the live tractor to the stalled tractor, means for raising and lowering the boom and means associated with the second upright member to lock the boom in the desired upward position when raised.

10. In combination with a live tractor having a fifth wheel, a towing hoist mechanism for a stalled tractor comprising a base having means to attach the towing hoist to the fifth wheel of the live tractor, upright members attached to each end of the base, a boom pivotally and horizontally adjustably connected to one of the upright members with attaching means on the end of the boom to connect the live tractor to the stalled tractor, means for raising and lowering the boom and means associated with the second upright member to lock the boom in the desired upward position when raised.

11. In combination with a live tractor having a fifth wheel, a towing hoist mechanism for a stalled tractor comprising a base made in two sections pivotally secured together and adjustable horizontally to vary the length of the base, one of the sections of the base having means to attach the towing hoist to the fifth wheel of the live tractor, upright members attached to each end of the base sections, a boom pivotally connected to one of the upright members with attaching means on the end of the boom to connect the live tractor to the stalled tractor, means for raising and lowering the boom and means associated with the second upright member to lock the boom in the desired upward position when raised.

12. In combination with a live tractor having a fifth wheel, a towing hoist mechanism for a stalled tractor comprising a base made in two sections pivotally secured together and adjustable horizontally to vary the length of the base, one of the sections of the base having means to attach the towing hoist to the fifth wheel of the live tractor, upright members attached to each of the base sections, a boom pivotally and horizontally adjustably connected to one of the upright members with attaching means on the end of the boom to connect the live tractor to the stalled tractor, means for raising and lowering the boom and means associated with the second upright member to lock the boom in the desired upward position when raised.

13. In combination with a live tractor having a fifth wheel, a towing hoist mechanism for a stalled tractor comprising a base made in two sections pivotally secured together and adjustable horizontally to vary the length of the base, one of the sections of the base having means to attach the towing hoist to the fifth wheel of the live tractor, upright members attached to each end of the base sections, a boom pivotally connected to one of the upright members with attaching means on the end of the boom to connect the live tractor to the stalled tractor, a hydraulic lift connected to one section of the base, an arm pivotally connected to the other section of the base having one end of the arm in contact with the hydraulic lift and the other end of the arm in contact with the boom and means associated with the second upright member to lock the boom in the desired upward position when raised.

14. In combination with a live tractor having a fifth wheel, a towing hoist mechanism for a stalled tractor comprising a base made in two sections pivotally secured together and adjustable horizontally to vary the length of the base, one of the sections of the base having means to attach the towing hoist to the fifth wheel of the live tractor, upright members attached to each end of the base sections, a boom pivotally and horizontally adjustably connected to one of the upright members with attaching means on the end of the boom to connect the live tractor to the stalled tractor, a hydraulic lift connected to one section of the base, an arm pivotally connected to the other section of the base having one end of the arm in contact with the hydraulic lift and the other end of the arm in contact with the boom and means associated with the second upright member to lock the boom in the desired upward position when raised.

BENNETT M. JOHNSON.

REFERENCES CITED

The following references are of record in the file of this patent:

UNITED STATES PATENTS

| Number | Name | Date |
|---|---|---|
| 681,175 | Condra | Aug. 20, 1901 |
| 1,498,151 | Butler | June 17, 1924 |
| 1,522,833 | Pedersen | Jan. 13, 1925 |
| 1,560,071 | Baker | Nov. 3, 1925 |
| 1,843,508 | Gledhill | Feb. 2, 1932 |
| 2,032,654 | Ferrier | Mar. 3, 1936 |
| 2,113,879 | Delalandre | Apr. 12, 1938 |
| 2,197,406 | Fleming et al. | Apr. 16, 1940 |
| 2,377,495 | Hofmeister | June 5, 1945 |
| 2,389,872 | Ruger et al. | Nov. 27, 1945 |
| 2,397,303 | Vowless | Mar. 26, 1946 |
| 2,433,086 | Borgelt | Dec. 23, 1947 |
| 2,441,310 | Caldwell et al. | May 11, 1948 |

FOREIGN PATENTS

| Number | Country | Date |
|---|---|---|
| 391,777 | Great Britain | Apr. 26, 1933 |